(12) United States Patent
Hintennach et al.

(10) Patent No.: US 8,833,428 B2
(45) Date of Patent: Sep. 16, 2014

(54) WINDING SHAFT OF A ROLLER BLIND SYSTEM AND ROLLER BLIND SYSTEM WITH WINDING SHAFT

(75) Inventors: Markus Hintennach, Reichenbach (DE); Reiner Hillemacher, Esslingen am Neckar (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/439,051

(22) Filed: Apr. 4, 2012

(65) Prior Publication Data

US 2012/0255688 A1 Oct. 11, 2012

(30) Foreign Application Priority Data

Apr. 8, 2011 (DE) .......................... 10 2011 007 082

(51) Int. Cl.
*A47G 5/02* (2006.01)
*A47H 1/00* (2006.01)
*B60J 1/20* (2006.01)
*B60J 3/00* (2006.01)
*B60J 11/00* (2006.01)
*E06B 9/44* (2006.01)

(52) U.S. Cl.
CPC ... *E06B 9/44* (2013.01); *B60J 1/205* (2013.01)
USPC ........................ 160/262; 160/313; 160/370.22

(58) Field of Classification Search
USPC ........... 160/238, 24, 262, 323.1, 324, 370.21, 160/370.22, 370.23, 170, 171; 242/613, 242/613.1, 118.3
See application file for complete search history.

(56) References Cited

U.S. PATENT DOCUMENTS

| 1,800,654 | A | * | 4/1931 | Nelson ........................... 160/262 |
| 4,823,859 | A | * | 4/1989 | Park ........................... 160/370.22 |
| 5,074,555 | A | * | 12/1991 | Meredith ....................... 473/323 |
| 5,881,792 | A | | 3/1999 | Cheng |
| 6,748,786 | B2 | * | 6/2004 | Ooyauchi et al. .......... 72/370.14 |
| 7,454,942 | B2 | | 11/2008 | Schulze |
| 2004/0166354 | A1 | | 8/2004 | Schulze |
| 2008/0041540 | A1 | * | 2/2008 | Li ............................ 160/370.22 |

FOREIGN PATENT DOCUMENTS

| CN | 201736771 U | 2/2011 |
| DE | 644 744 C | 5/1937 |
| DE | 27 32 260 A1 | 1/1979 |
| DE | 33 01 853 A1 | 7/1984 |
| DE | 44 21 683 A1 | 1/1996 |
| DE | 196 25 231 A1 | 1/1998 |

(Continued)

OTHER PUBLICATIONS

Search Report issued in European Patent Office for EP 12 15 9109 dated Apr. 17, 2012 with English translation of categories of cited documents (5 pages).

(Continued)

*Primary Examiner* — Katherine Mitchell
*Assistant Examiner* — Jeremy Ramsey
(74) *Attorney, Agent, or Firm* — Flynn, Thiel, Boutell & Tanis, P.C.

(57) ABSTRACT

A winding shaft for a roller blind system with a main body for holding a rolled up planar structure that can be unwound from the winding shaft, wherein the main body takes the form of a partial cone around a winding shaft axis. The main body is formed as a hollow metal tube shaped as a partial cone.

7 Claims, 1 Drawing Sheet

(56) References Cited

FOREIGN PATENT DOCUMENTS

| | | |
|---|---|---|
| DE | 200 11 452 U1 | 12/2001 |
| DE | 102 04 331 A1 | 8/2003 |
| DE | 10 2007 051 056 B3 | 4/2009 |
| EP | 1 464 566 A2 | 10/2004 |
| FR | 2 850 702 A1 | 8/2004 |
| FR | 2 931 397 A1 | 11/2009 |

OTHER PUBLICATIONS

Office Action issued in German Patent Office for DE 10 2011 007 082.6 dated Nov. 9, 2011 (7 pages).

* cited by examiner

WINDING SHAFT OF A ROLLER BLIND SYSTEM AND ROLLER BLIND SYSTEM WITH WINDING SHAFT

CROSS REFERENCE TO RELATED APPLICATIONS

This application claims the priority of German Application No. 10 2011 007 082.6, filed Apr. 8, 2011, the disclosure of which is hereby incorporated by reference in its entirety into this application.

FIELD AND BACKGROUND OF THE INVENTION

The invention relates to a winding shaft for a roller blind system with a main body for holding a rolled up planar structure that can be unwound from the winding shaft, where the main body takes the form of a partial cone around a winding shaft axis.

Generic winding shafts are known to the pri- or art. They are used for roller blind systems in motor vehicles where it is desirable for a planar structure stowed on the winding shaft not to be unrolled from the winding shaft in a straight line, but to follow a slightly curved path. The outsides of these generic winding shafts have the form of a partial cone, where opening angles of less than 10° are usually employed.

The manufacture of generic winding shafts has until now represented a problem with no satisfactory solution. The effort required to produce a conically widened plastic body is comparatively high, and its stability is not satisfactory. For this reason, use is instead most often made of cylindrical base bodies onto which a planar structure is glued and which, due to an approximately triangular form of the planar structure when glued, gives the winding shaft an approximately conical form. The use of hollow cylindrical shafts as a base body, onto the surface of which plastic is sprayed in order to achieve the shape of a cone or partial cone, is also known.

SUMMARY OF THE INVENTION

The object of the invention is to provide an alternative design for a winding shaft that is advantageous from the points of view of the effort of manufacture and of its functional properties.

This is achieved in accordance with the invention in that the main body of a generic winding shaft is formed as a hollow metal part shaped as a partial cone.

It has been found that if appropriate manufacturing methods are used, the direct manufacture of the main body in the shape of a partial cone as a hollow, metal part is easy to handle and furthermore leads to superior properties of the winding shaft in respect of its vibration properties and its stiffness. A winding shaft in accordance with the invention thus comprises a hollow metal part of this type shaped as a partial cone, which preferably itself offers, in its exterior surface, that surface onto which the lowest layer of the planar structure can be wound directly.

It is considered advantageous if not only the external diameter of this hollow metal body has the form of a partial cone, but also its interior surface. As a result, the mass is lower than that of a winding shaft with a cylindrical inner surface. It may however be seen as particularly advantageous if the conicity of the exterior surface and the inner surface of the winding shaft are designed such that the wall thickness of the main body changes along the direction of the winding shaft axis. It has been found that a variable wall thickness of the main body of this sort provides the advantageous possibility of being able specifically to give the main body increased stability and improved vibrational properties. It is particularly advantageous here if the wall thickness increases from a first end of the main body of greater external diameter down towards a second end of the main body of smaller diameter. As a result, the mass distribution of the winding shaft is more evenly distributed. The torsional stiffness is also increased in the region with the smaller external diameter.

In order to achieve a low mass, it is advantageous if the main body is made of aluminium or of an aluminium alloy.

The outer surface in particular of a winding shaft in accordance with the invention can be manufactured by metal-cutting manufacturing methods. A variable internal diameter too can be achieved through metal-cutting manufacture, for instance by step-drilling using drills of various diameter.

It is nevertheless advantageous if the main body is shaped as a partial cone starting from a cylindrical metal tube by means of a forming process, particularly preferably by means of a hot-forming process and/or preferably through blows made with a hammer along the central axis of the metal tube.

This way of manufacturing winding shafts or their main bodies in accordance with the invention is of considerable economical advantage when winding shafts in accordance with the invention are mass produced. This avoids or minimizes the metal-cutting manufacturing steps. The main step in machining is performed by forming the originally cylindrical metal tube, which is preferably subjected to hammer blows while a rotary movement of the metal tube is being executed, leading to a reduction in the external diameter of the metal tube. It is also of particular advantage here that the required increase in the wall thickness in the region of smaller external diameter is in this way already achieved without the need to perform an additional step for this purpose. In those areas where the external diameter is significantly reduced as a result of radial blows, the wall thickness is also increased. Assuming that the blows applied for the forming process only result in an insignificant increase in the length of the main body, this even leads to a largely consistent mass distribution of the main body along the winding shaft.

This production method for making a winding shaft in accordance with the invention or its conical main body is itself also to be understood as part of the invention.

The invention moreover concerns a roller blind system having a winding shaft axis rotatably mounted about a winding shaft axis as well as a flexible planar structure, one edge of which is fastened to the winding shaft. The winding shaft is here designed as described above.

It is of particular advantage here if a coil spring is mounted inside the winding shaft, this coil spring being preferably arranged, relative to a centre of the winding shaft, offset towards the end with the greater external diameter.

This design exploits the fact that in the region with the greater external diameter, the internal diameter of a winding shaft in accordance with the invention is also usually greater, so that the space needed to house the coil spring is available here. One end of the coil spring is connected directly or indirectly to the main body of the winding shaft. Its opposite end is designed to be attached to a mounting part of the roller blind system that has a fixed location during operation.

BRIEF DESCRIPTION OF THE DRAWINGS

Further aspects and advantages of the invention emerge are found not only in the claims but also in the following description of a preferred embodiment of the invention.

DETAILED DESCRIPTION

Figure 1:
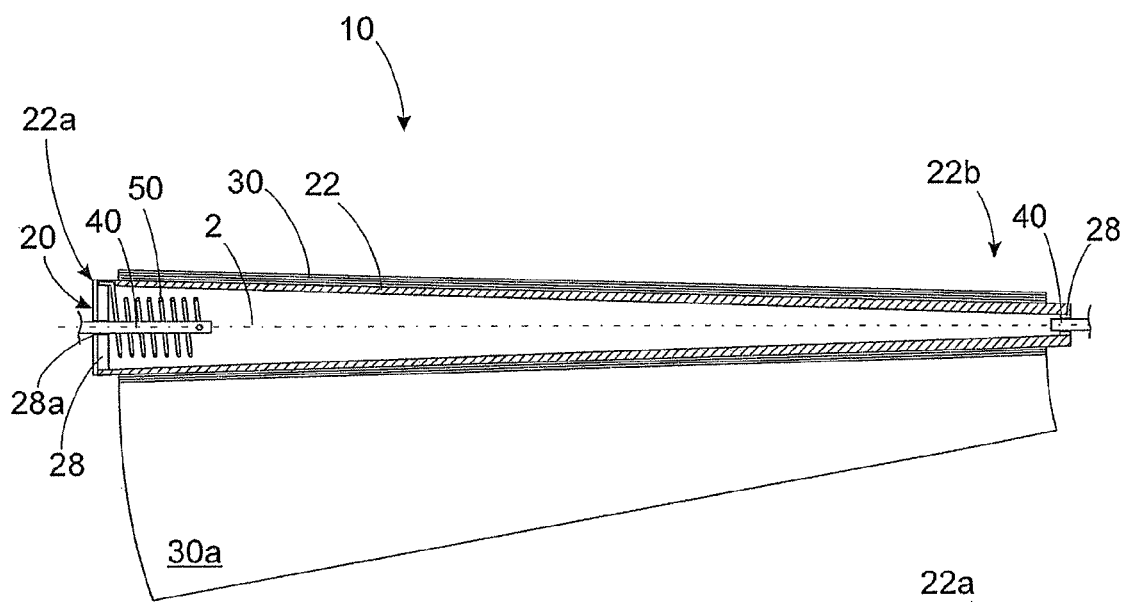
FIG. 1 shows a sectional view of a roller blind system in accordance with the invention with a winding shaft in accordance with the invention and FIG. 2 shows a separate illustration of the main body of the winding shaft of the roller blind system according to FIG. 1.

FIG. 1 illustrates a roller blind system 10 in accordance with the invention with a winding shaft 20 in accordance with the invention.

This roller blind system 10 is designed in particular for use in the interior of a vehicle. Due to its special feature in accordance with the invention, the conical shape of the winding shaft 20, it is particularly useful for shading systems for the side windows of the vehicle.

The roller blind system 10 has as the primary components a winding shaft 20 with a main body 22 as well as caps 28 at the ends. A planar structure 30 is partially wound onto the outer surface of the main body 22. As can be seen from the partially unwound area 30a of the planar structure 30, the latter is not rectangular, but has a shape approximating to that of a circular segment. Planar structures with this shape are usual for the side windows as mentioned of the vehicle.

Figure 2:
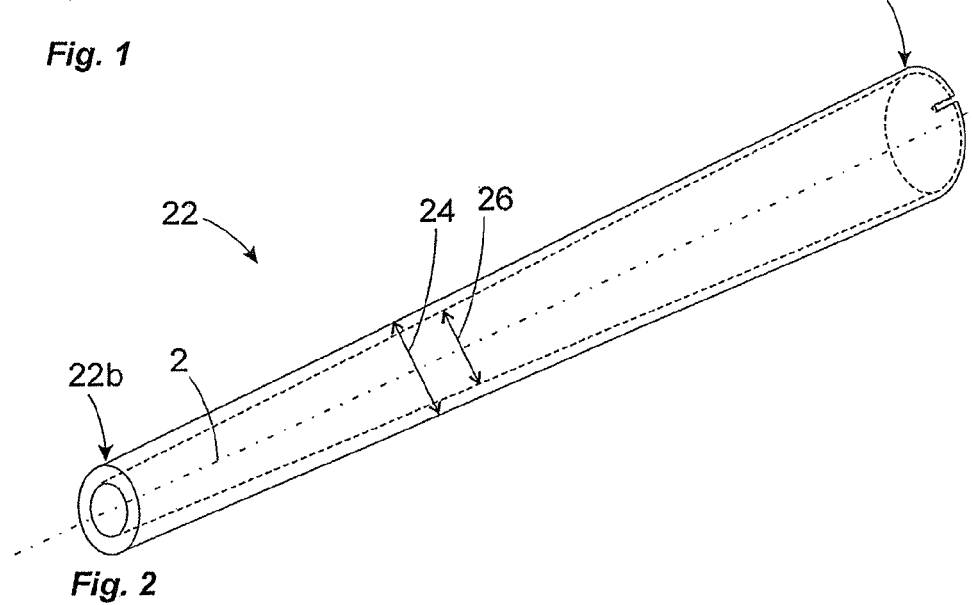

The main body 22 that serves to hold the planar structure, which is represented separately in FIG. 2, is adapted to this shape of the planar structure and is designed as a hollow metal tube with a tapering external diameter. This external diameter 24 is at its maximum at a first end 22a, and tapers from there continuously down to an opposite, second end 22b. The internal diameter 26 of the main body 22 also tapers, but to an even greater extent, so that the thickness of the walls in the region of the first end 22a is significantly less than it is at the opposite end 22b. As a result, the mass distribution of the main body 22 made of aluminium remains substantially constant along the central axis 2. That part whose external diameter is greater in the direction of the end 22a therefore does not have a greater mass corresponding to the increased external diameter, relative to a defined unit of length, in the direction of the central axis 2.

As can be seen from FIG. 1, the two ends of the main body 22, which is preferably between 20 cm and 50 cm in length and whose opening angle is preferably greater than 0° and less than 10°, are closed by means of the aforementioned end caps 28. Bearing holes 28a are provided in these end caps 28, through which protrude axle stubs 40 fixed to the vehicle. Whereas the axle stub 40 at the narrow end 22b merely has the function of a bearing, the axle stub 40 at the opposite end 22a also functions as the thrust bearing for a coil spring 50. One end of this coil spring is fastened to the axle stub 40 and the opposite end is inserted into a recess in the main body 22, so that the coil spring 50 is twisted as the planar structure 30 is unwound.

In order to manufacture the winding shaft in accordance with the invention, in particular the main body, a cylindrical metal tube is first used as a blank workpiece. It has an external diameter equalling or greater than the external diameter at the end 22a of the main body. This cylindrical tube is tapered by blows applied radially in the direction of the central axis 2, where the blows generated by a tool preferably under automatic control are distributed over the cylindrical metal tube circumference. The cylindrical metal tube is preferably rotated for this purpose during its machining and the associated tapering while being particularly preferably moved axially, continuously or in steps. This manufacturing method results in the greater wall thickness at the end of 22b compared with the end 22a, without the necessity of taking additional steps.

The invention claimed is:

1. A roller blind system comprising:
a winding shaft rotatably mounted about a winding shaft axis; and
a flexible planar structure, one edge of which is fastened to the winding shaft;
wherein the winding shaft includes a main body holding the flexible planar structure to allow the flexible planar structure to be unwound from the winding shaft, the main body being a hollow metal tube having a form of a partial cone around the winding shaft axis;
wherein a thickness of a wall of the main body varies continuously along a direction of the winding shaft axis from a first main end of the main body to a second main end of the main body; and
wherein the winding shaft tapers inwardly from a first shaft end of the shaft to a second shaft end of the shaft; and
wherein the thickness of the wall increases from the first shaft end of the winding shaft with a greater external diameter towards the second shaft end of the winding shaft with a smaller diameter.

2. The roller blind system of claim 1, wherein:
the main body consists of aluminium or of an aluminium alloy.

3. The roller blind system of claim 1, wherein:
the main body is shaped as the partial cone starting from a cylindrical metal tube through blows made with a hammer along a central axis of the cylindrical metal tube.

4. The roller blind system of claim 1, wherein:
a coil spring is mounted inside the winding shaft.

5. The roller blind system of claim 4, wherein:
the coil spring is arranged relative to a center of the winding shaft offset towards the first shaft end.

6. A vehicle with the roller blind system according to claim 1.

7. A roller blind system for a vehicle comprising:
a winding shaft rotatably mounted about a winding shaft axis and a flexible planar structure, one edge of the flexible planar structure being fastened to the winding shaft and being wound on the winding shaft, the winding shaft having a form of a hollow partial cone and being formed of metal, the winding shaft having a main body forming a wall, wherein a thickness of the wall increases continuously from a first end of the winding shaft with a greater external diameter towards a second end of the winding shaft with a smaller diameter, and wherein the winding shaft tapers from the first end to the second end thereof.

* * * * *